US009894306B2

United States Patent
Tanaka

(10) Patent No.: US 9,894,306 B2
(45) Date of Patent: Feb. 13, 2018

(54) RADIATION IMAGING SYSTEM, CONTROL APPARATUS, CONTROL METHOD, AND STORAGE MEDIUM

(71) Applicant: CANON KABUSHIKI KAISHA, Tokyo (JP)

(72) Inventor: Hikaru Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 396 days.

(21) Appl. No.: 14/190,232

(22) Filed: Feb. 26, 2014

(65) Prior Publication Data

US 2014/0252205 A1 Sep. 11, 2014

(30) Foreign Application Priority Data

Mar. 6, 2013 (JP) .................... 2013-044723

(51) Int. Cl.
*H04N 5/376* (2011.01)
*H04N 5/32* (2006.01)
*H04N 5/378* (2011.01)

(52) U.S. Cl.
CPC ............. *H04N 5/3765* (2013.01); *H04N 5/32* (2013.01); *H04N 5/378* (2013.01)

(58) Field of Classification Search
CPC ......... H04N 5/3765; H04N 5/32; H04N 5/378
USPC ................... 250/208.1, 214 P; 348/294–324; 372/38.09
See application file for complete search history.

(56) References Cited

U.S. PATENT DOCUMENTS

2010/0078583 A1\* 4/2010 Tsubota ................. A61B 6/548
250/580

FOREIGN PATENT DOCUMENTS

JP 2009-219538 10/2009
JP 2010-273858 12/2010

OTHER PUBLICATIONS

U.S. Appl. No. 14/188,842, filed Feb. 25, 2014.

\* cited by examiner

*Primary Examiner* — Renee Chavez
(74) *Attorney, Agent, or Firm* — Fitzpatrick Cella Harper and Scinto

(57) ABSTRACT

A radiation imaging system includes a radiation imaging apparatus including a radiation detection unit in which conversion elements configured to convert radiation into electric charges are arranged and a driving unit configured to drive the radiation detection unit, and a control apparatus configured to control the radiation imaging apparatus. The control apparatus includes: a determination unit configured to determine whether a remaining image sensing enable time acquired by subtracting an elapsed time from initialization of the radiation detection unit from an image sensing enable time for a radiation image in use of the radiation detection unit is not less than a threshold time; a control unit configured to change operating states of the radiation detection unit and the driving unit in accordance with the determination result; and an operation detection unit configured to detect an operation instruction for the control unit.

10 Claims, 15 Drawing Sheets

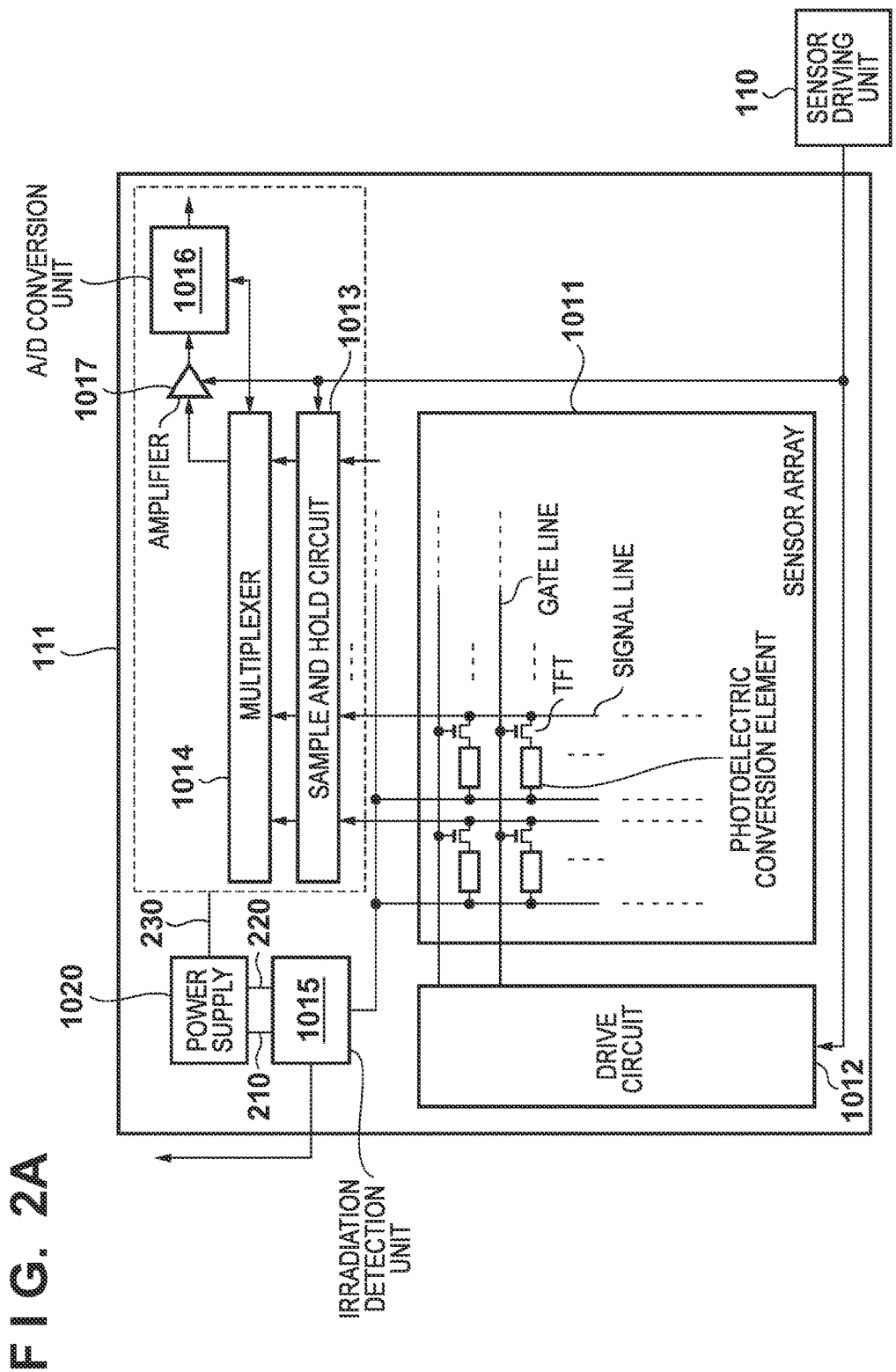

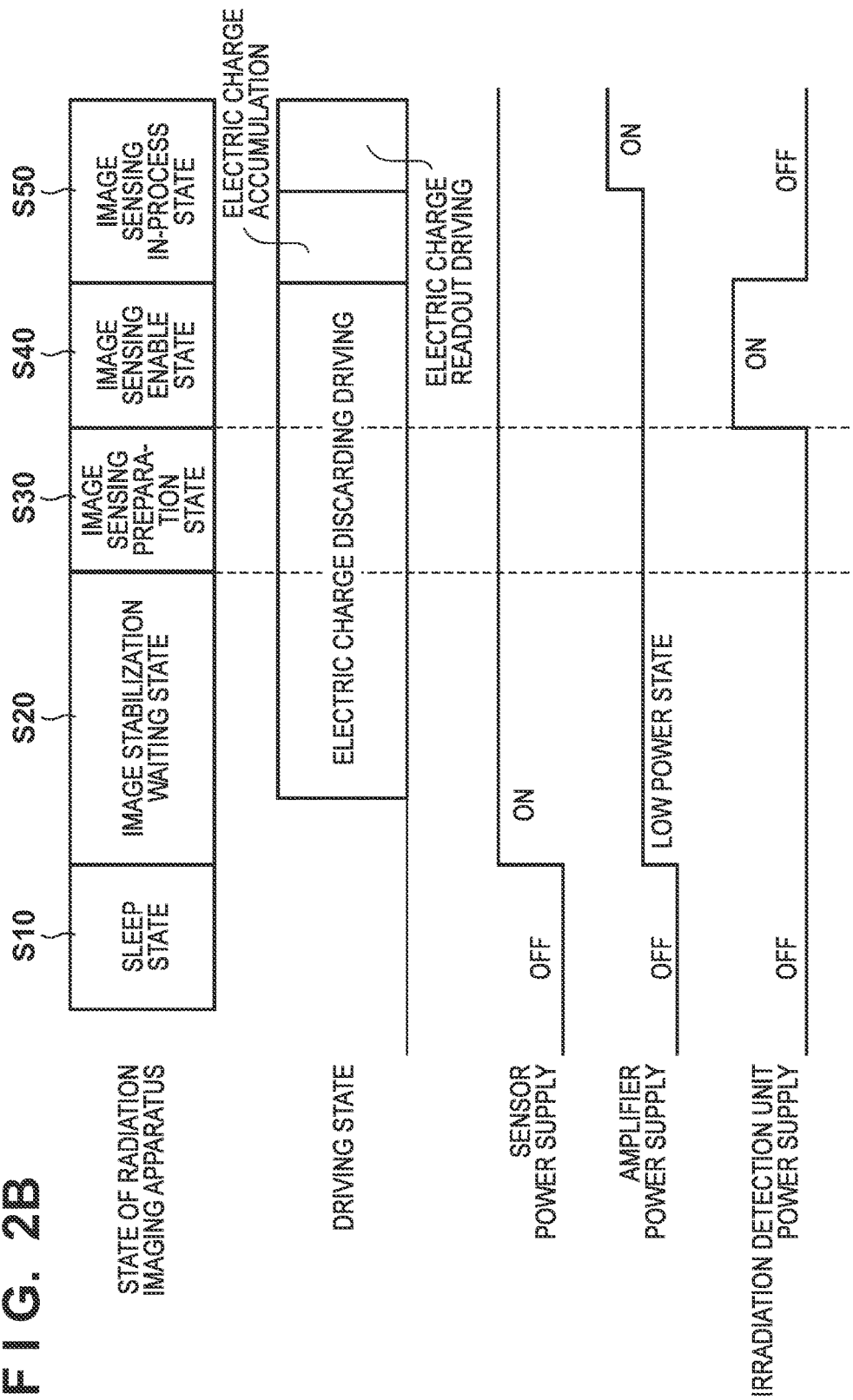

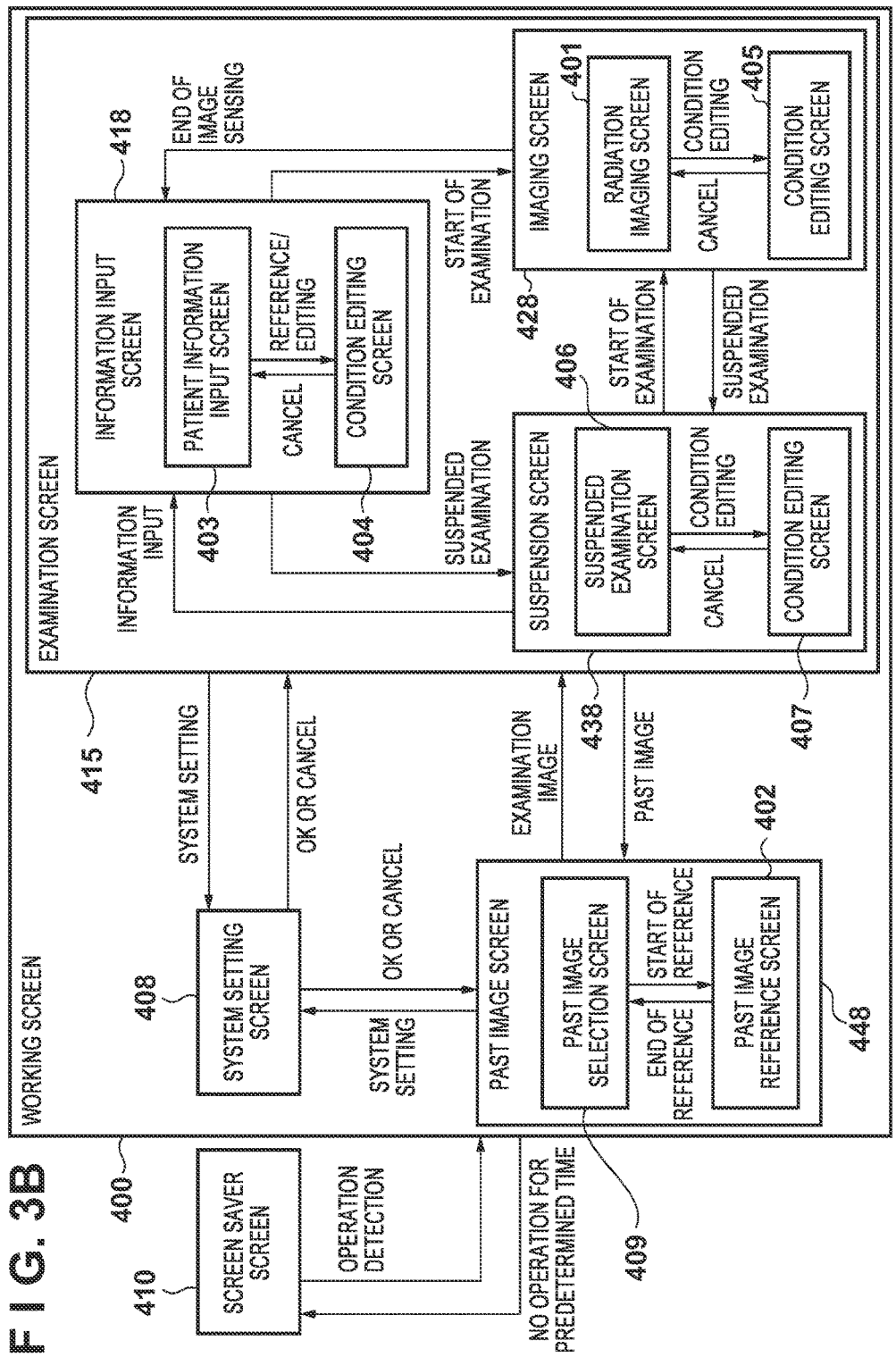

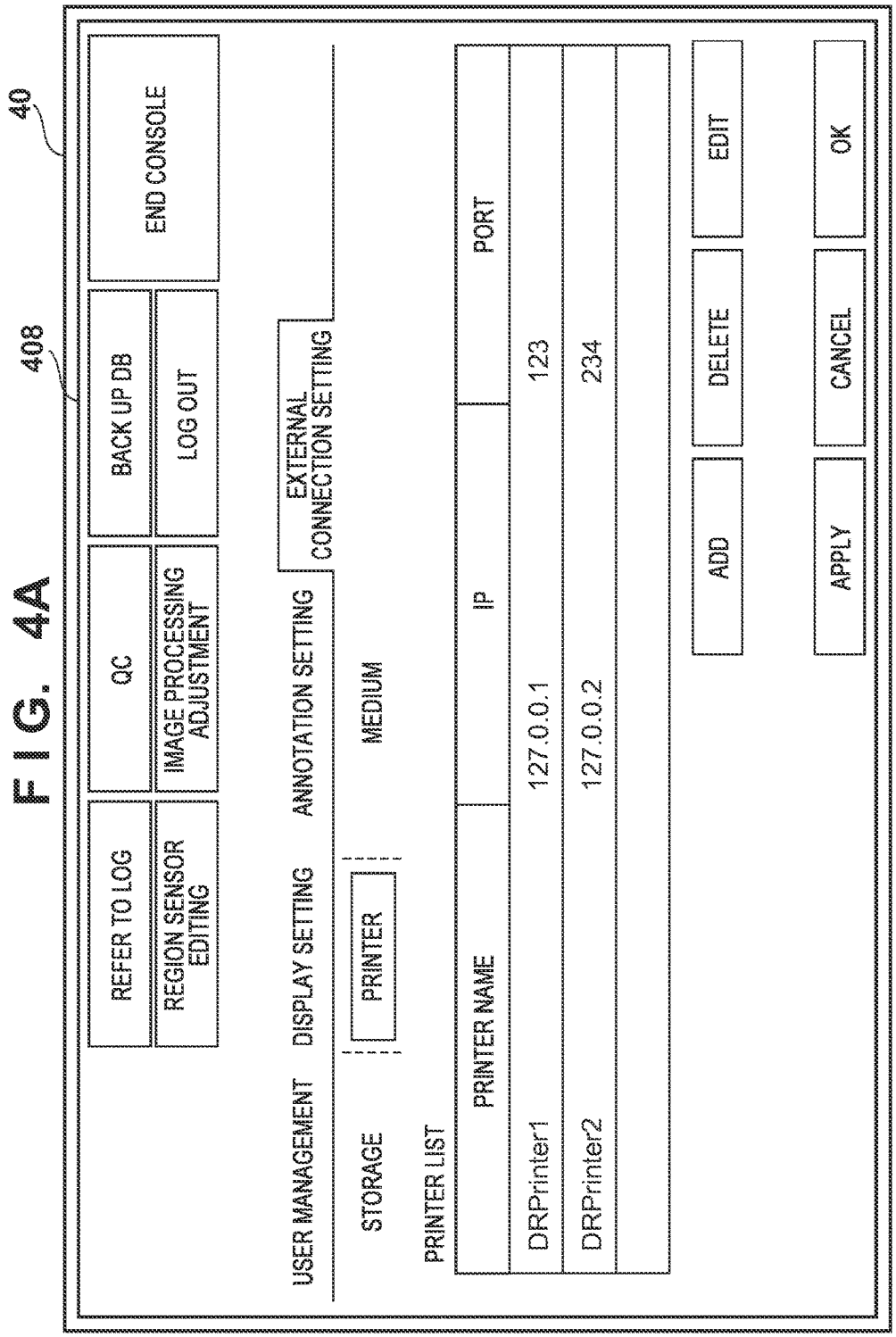

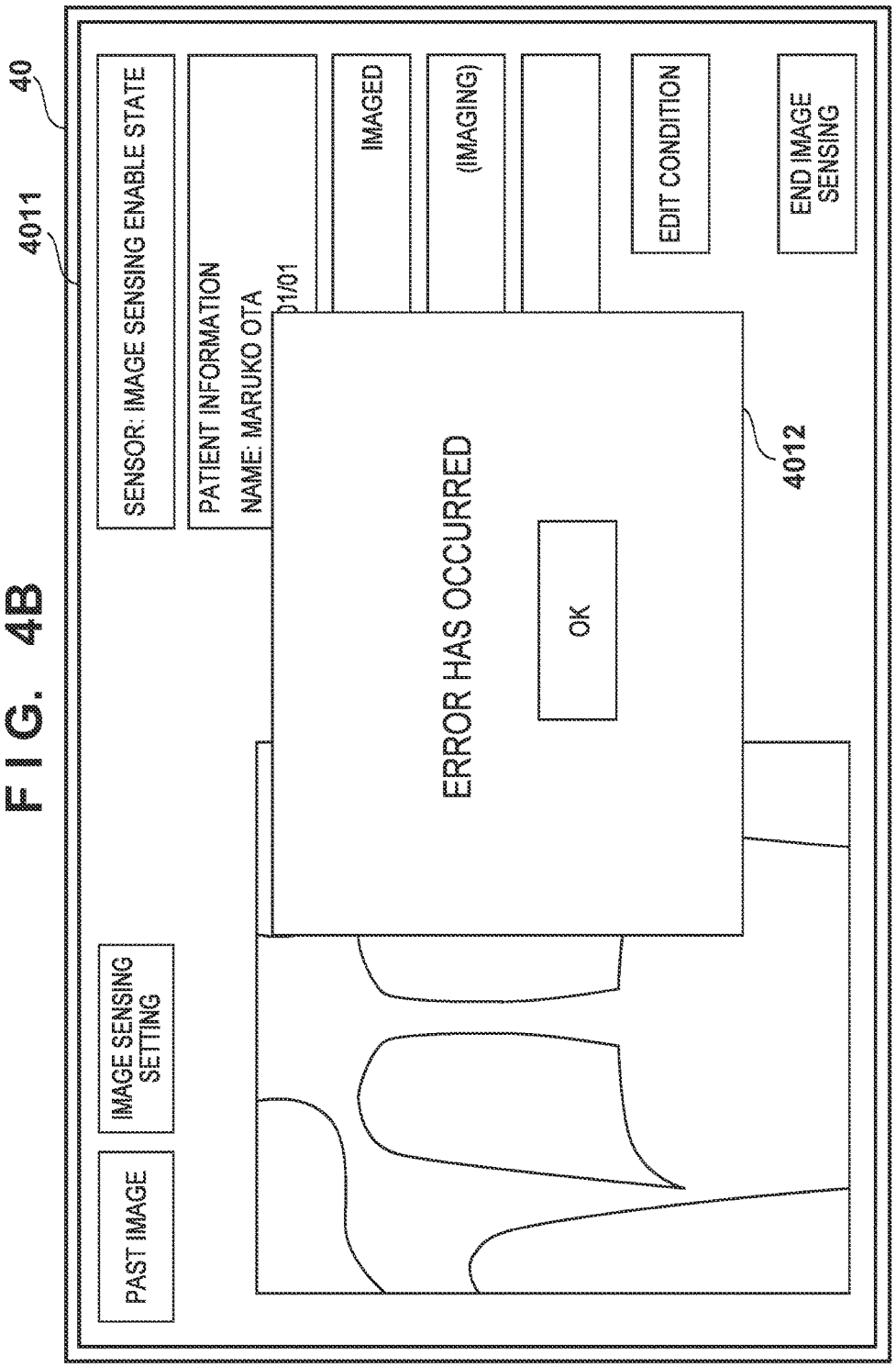

FIG. 5A

| PAST IMAGE | IMAGING SCREEN | SUSPENDED EXAMINATION | | SYSTEM |

PATIENT NAME :
PATIENT ID :
BIRTH DATE :

PATIENT LIST

| PATIENT NAME | PATIENT ID | BIRTH DATE |
|---|---|---|
| MARUKO OTA | 012345 | 1999/01/01 |
| TARO SIMOMARU | 123456 | 1998/02/02 |
| ICHIRO MUSASI | 234567 | 1997/03/03 |
| JIRO NITTA | 345678 | 1996/04/04 |
| SABURO TOKYO | 456789 | 1995/05/05 |
| SHIRO NIHON | 567890 | 1994/06/06 |

510 — EDIT CONDITION 40
403

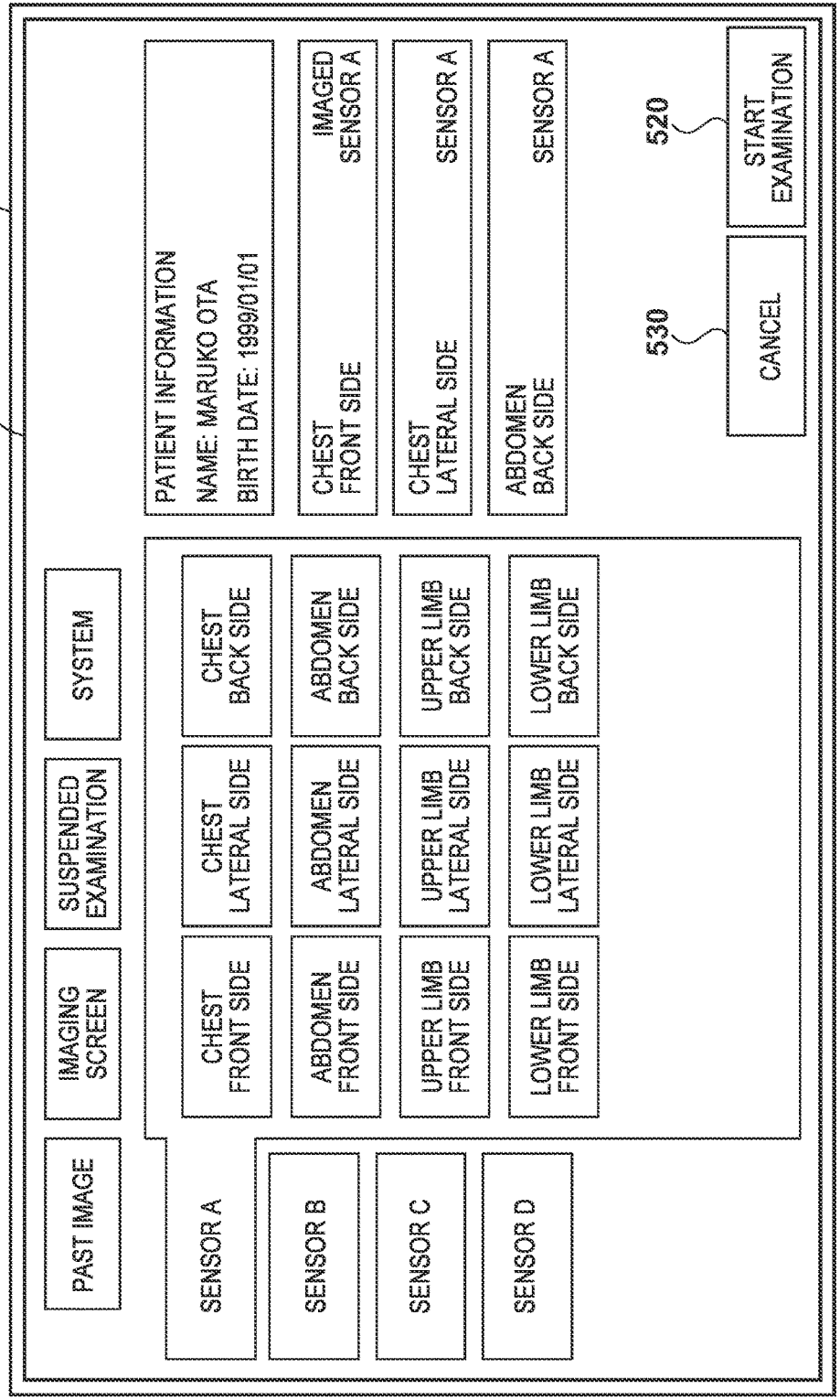

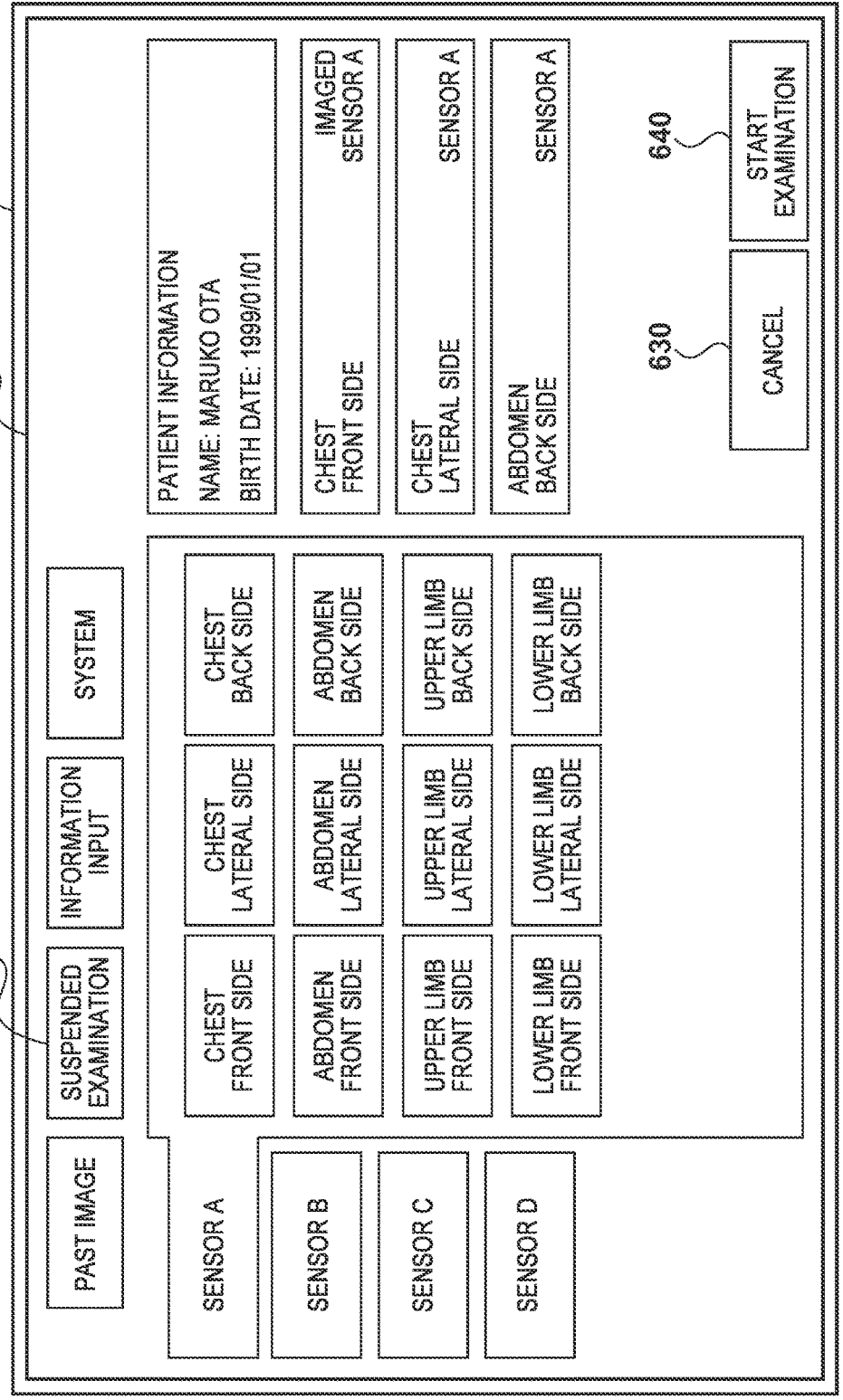

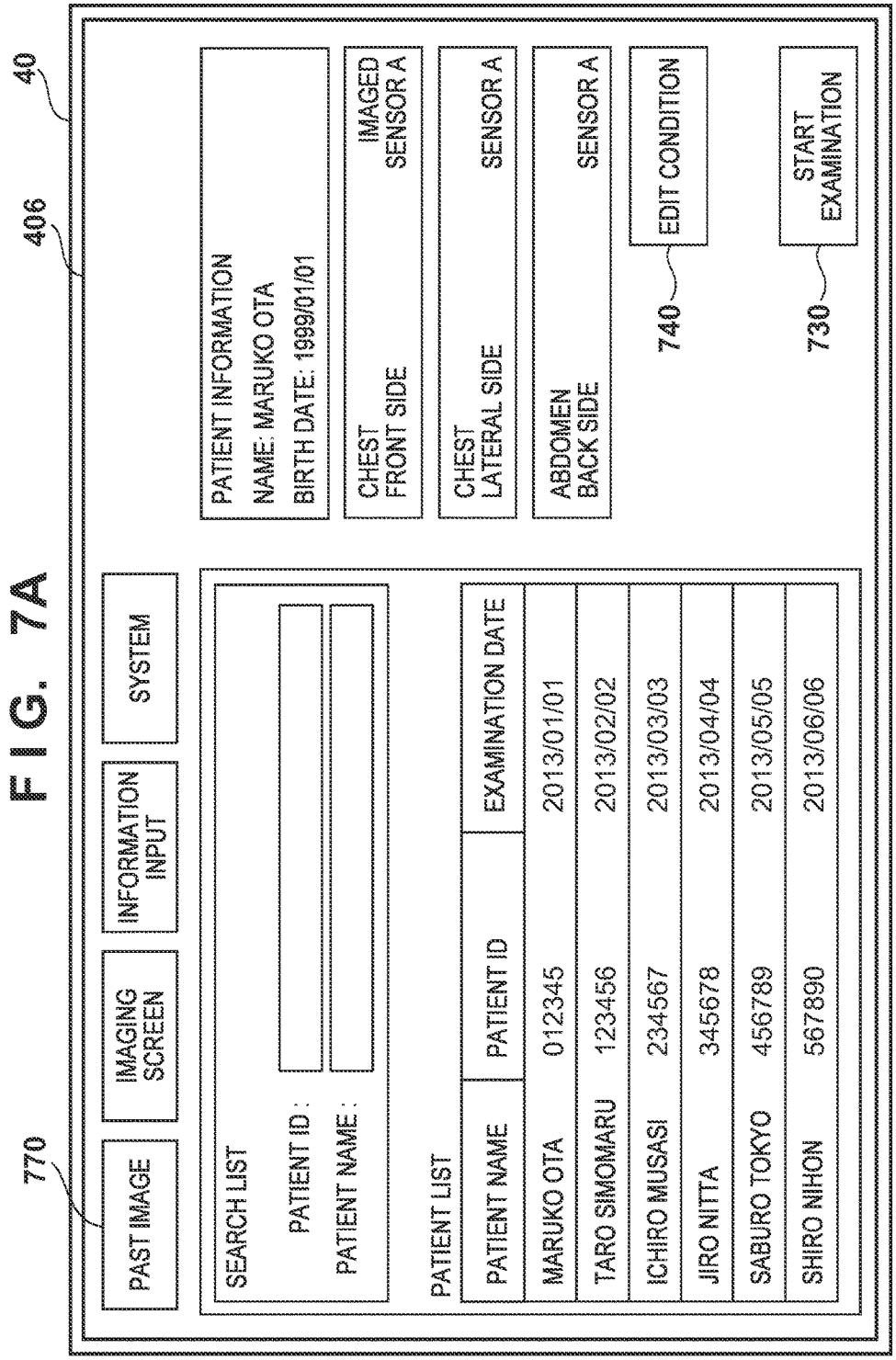

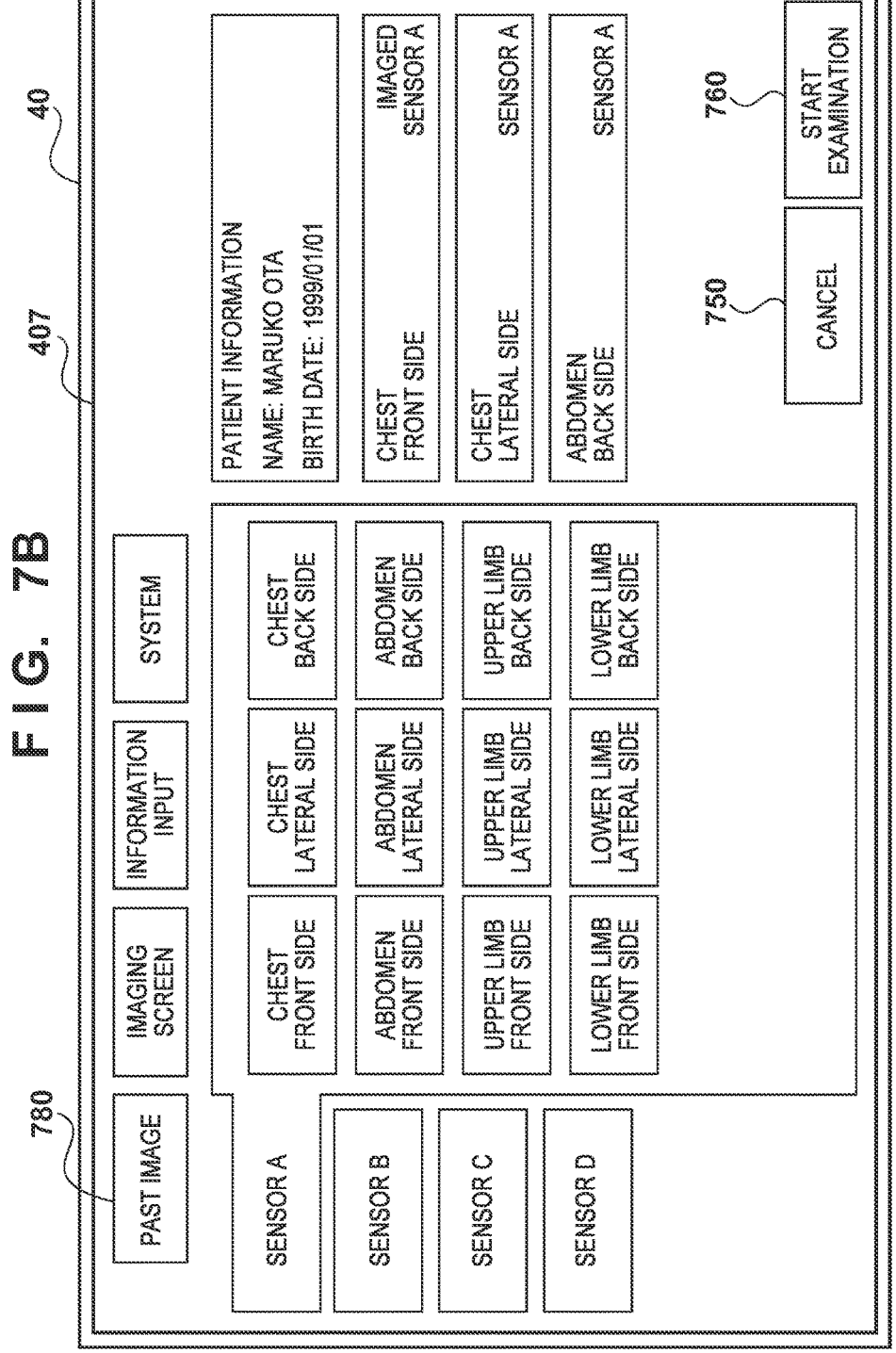

FIG. 8A

| EXAMINATION SCREEN | SYSTEM |

SEARCH LIST

PATIENT ID :
PATIENT NAME :

PATIENT LIST

| PATIENT NAME | PATIENT ID | EXAMINATION DATE |
|---|---|---|
| MARUKO OTA | 012345 | 2013/01/01 |
| TARO SIMOMARU | 123456 | 2013/02/02 |
| ICHIRO MUSASI | 234567 | 2013/03/03 |
| JIRO NITTA | 345678 | 2013/04/04 |
| SABURO TOKYO | 456789 | 2013/05/05 |
| SHIRO NIHON | 567890 | 2013/06/06 |

PATIENT INFORMATION
NAME: MARUKO OTA
BIRTH DATE: 1999/01/01

CHEST FRONT SIDE — SENSOR A

CHEST LATERAL SIDE — SENSOR A

ABDOMEN BACK SIDE — SENSOR A

START REFERENCE — 810

40
409

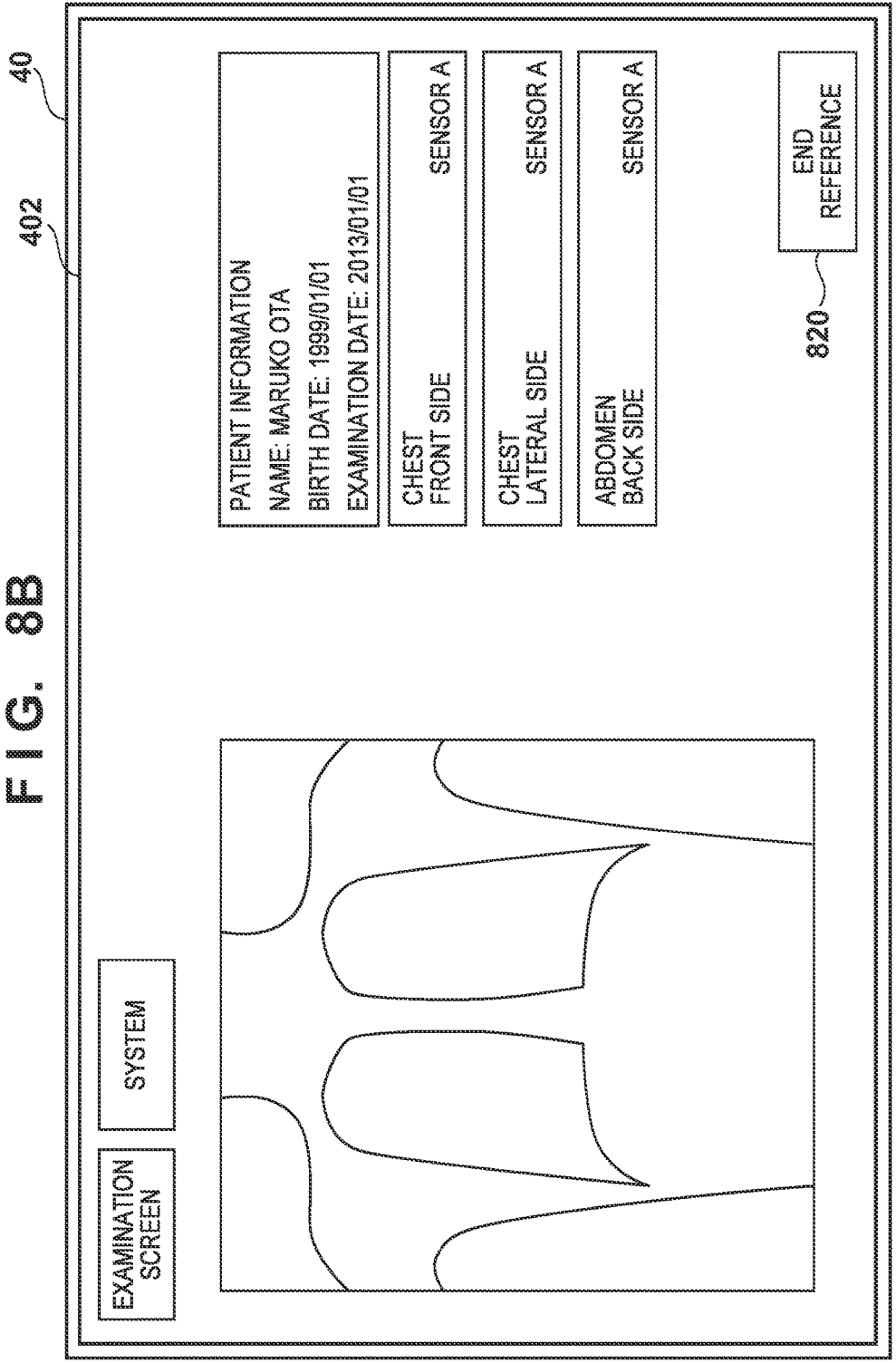

RADIATION IMAGING SYSTEM, CONTROL APPARATUS, CONTROL METHOD, AND STORAGE MEDIUM

BACKGROUND OF THE INVENTION

Field of the Invention

The present invention relates to a radiation imaging system, a control apparatus, a control method, and a storage medium.

Description of the Related Art

There has been commercialized a radiation imaging system using a radiation generation apparatus which irradiates an object with radiation, a radiation imaging apparatus which generates a clear radiation image by processing the radiation image obtained by digitizing a radiation image as the intensity distribution of radiation, and an image processing apparatus. Such a radiation imaging system transfers, to the image processing apparatus such as a control computer for image processing and storage, radiation image data obtained by the radiation imaging apparatus upon causing the radiation generating apparatus to irradiate an object with radiation. The image processing apparatus displays an image having undergone image processing on a display device such as a display.

The radiation imaging apparatus forms an image based on an electrical signal generated in accordance with radiation. For example, the radiation detection unit of the radiation imaging apparatus includes a sensor array formed by stacking scintillators on photoelectric conversion elements (conversion elements) or the like which convert radiation into image signal electric charges (electrical signals). The radiation imaging apparatus causes the sensor array to convert radiation into visible light through the scintillators, holds the visible light as electric charges, and forms an image from readout electric charges. The radiation imaging apparatus which forms an image from the amount of electric charges requires the elapse of a predetermined time since the energization of a circuit for driving the conversion elements to set an image sensing enable state for image quality stabilization.

For example, Japanese Patent Laid-Open No. 2010-273858 discloses a method of saving power by shortening the time taken to be ready for image sensing. Japanese Patent Laid-Open No. 2010-273858 has proposed a method of shortening the time taken to be ready for image sensing by changing the timeout time from the energization of a circuit for setting an image sensing enable state in accordance with the input state of patient information and an image sensing protocol.

In addition, in a conventional radiation imaging system, a radiation imaging apparatus performs image sensing upon matching the timing of radiation generation with the timing of image sensing by the radiation imaging apparatus by communication between a radiation generation apparatus and the radiation imaging apparatus. Recently, in order to simplify a system configuration required for communication, for example, according to Japanese Patent Laid-Open No. 2009-219538, there has been developed a radiation imaging system based on a scheme which performs image sensing immediately after the detection of radiation by the radiation imaging apparatus without performing communication between a radiation generation apparatus and the radiation imaging apparatus. In this radiation imaging system, ensuring a wide dynamic range covering a low dose of emitted radiation to a high dose of emitted radiation will cause a circuit for driving conversion elements and other electric circuit elements to generate noise such as thermal noise and shot noise. This reduces the S/N ratio in a low-dose region, in particular, resulting in a deterioration in the image quality of an obtained radiation image. Setting the sensor in an image sensing enable state for a predetermined time or more will increase the influence of noise. For this reason, the sensor is set in an image sensing disable state (sleep mode) by stopping driving the sensor to reset electric charges accumulated in the conversion elements. This reduces noise and suppresses a deterioration in image quality.

In the method disclosed in Japanese Patent Laid-Open No. 2010-273858, when it takes much time to input patient information and an image sensing protocol, the remaining time for actual image sensing decreases. For example, a timeout occurs during matching with the respiratory timing of a patient, and the sensor is set in the image sensing disable state. The sensor therefore needs a predetermined waiting time to enter the image sensing enable state again.

In addition, according to Japanese Patent Laid-Open No. 2009-219538, if the operator performs radiation irradiation without noticing that the apparatus has stopped driving the sensor and set it in the image sensing disable state, the apparatus may fail to perform desired radiation imaging (misshooting).

The present invention provides a radiation imaging technique which can perform radiation imaging while saving power and ensuring a sufficient image sensing time for actual image sensing.

SUMMARY OF THE INVENTION

According to one aspect of the present invention, there is provided a radiation imaging system including a radiation imaging apparatus including a radiation detection unit in which a plurality of conversion elements configured to convert radiation into electric charges are arranged and a driving unit configured to drive the radiation detection unit, and a control apparatus configured to control the radiation imaging apparatus, wherein the control apparatus comprises: a determination unit configured to determine whether a remaining image sensing enable time acquired by subtracting an elapsed time from initialization of the radiation detection unit from an image sensing enable time for a radiation image in use of the radiation detection unit is not less than a threshold time; a control unit configured to change operating states of the radiation detection unit and the driving unit in accordance with the determination result; and an operation detection unit configured to detect an operation instruction for the control unit, and wherein if it is determined that the remaining image sensing enable time is not less than the threshold time, the control unit energizes the radiation detection unit and the driving unit to set the operating state to an image sensing enable state, and if the operation detection unit detects an operation instruction for editing an image sensing condition in the operating state, the determination unit determines whether the remaining image sensing enable time is not less than the threshold time.

According to the present invention, it is possible to perform radiation imaging while saving power and ensuring a sufficient image sensing time for actual image sensing and reduce the possibility of misshooting, that is, failing to perform radiation imaging.

Further features of the present invention will become apparent from the following description of exemplary embodiments (with reference to the attached drawings).

BRIEF DESCRIPTION OF THE DRAWINGS

FIG. 2A is a block diagram showing an example of the arrangement of a radiation detection unit;

FIG. 2B is a chart for explaining the operating state of a radiation imaging apparatus;

FIG. 3B is a block diagram for explaining screen changing (screen transition) by a display control unit;

FIG. 4A is a view exemplarily showing a system setting screen;

FIG. 4B is a view exemplarily showing a warning screen;

FIGS. 5A and 5B are views exemplarily showing information input screens;

FIG. 6B is a view showing an example of a condition editing screen;

FIG. 7A is a view showing an example of a suspended examination screen;

FIG. 7B is a view showing an example of a condition editing screen;

FIG. 8A is a view showing an example of a past image selection screen; and

FIG. 8B is a view showing an example of a past image reference screen.

DESCRIPTION OF THE EMBODIMENTS

Embodiments of the present invention will be exemplarily described in detail below with reference to the accompanying drawings. Note that the constituent elements described in the embodiments are merely examples. The technical scope of the present invention is determined by the scope of claims and is not limited by the following individual embodiments.

Figure 1A:
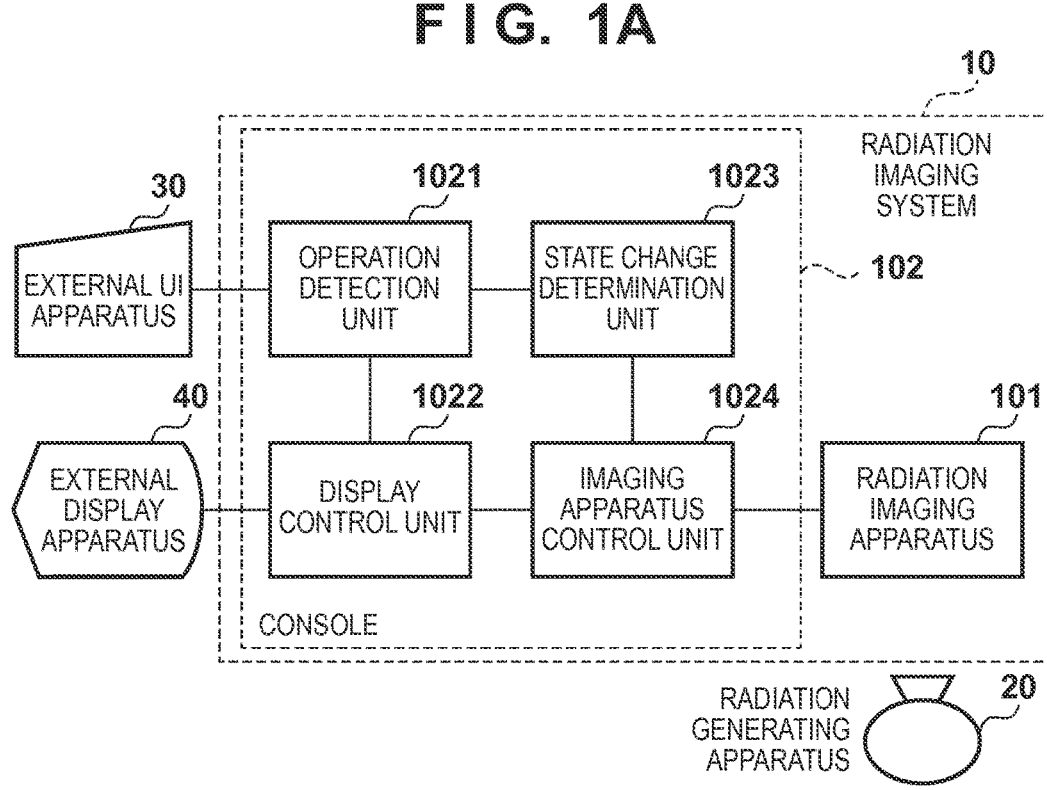
FIGS. 1A and 1B are block diagrams showing the arrangement of a radiation imaging system according to an embodiment.

FIG. 1A is a block diagram showing an example of the arrangement of a radiation imaging system according to an embodiment of the present invention. A radiation imaging system 10 includes a radiation imaging apparatus 101 and a console 102 (control apparatus). The radiation imaging apparatus 101 captures a radiation image based on radiation emitted from a radiation generation apparatus 20. The console 102 (control apparatus) processes the radiation image data captured by the radiation imaging apparatus 101 by controlling the operating state of the radiation imaging apparatus 101. The console 102 controls the radiation imaging apparatus 101 by operation from an external UI apparatus 30 or based on an instruction generated by internal processing in the console 102. The console 102 includes an operation detection unit 1021, a display control unit 1022, a state change determination unit 1023, and an imaging apparatus control unit 1024.

The operation detection unit 1021 detects, as an operation instruction, an input from the external UI apparatus 30 or the instruction generated by internal processing in the console 102. The display control unit 1022 displays a screen for allowing the operator to perform operation and editing while the radiation imaging apparatus 101 is in an operating state (a sleep state, image sensing preparation state, or the like), an operation screen corresponding to the operation instruction input from the external UI apparatus 30, a captured radiation image, and the like on the external display apparatus 40. The display control unit 1022 performs display screen changing (transition) based on the operation instruction detected by the operation detection unit 1021.

The state change determination unit 1023 determines, based on the operation instruction detected by the operation detection unit 1021, whether to change (state transition) the operating state of the radiation imaging apparatus 101, and instructs the imaging apparatus control unit 1024 to change the operating state (state transition) in accordance with the determination result. In addition, the state change determination unit 1023 determines the operating state (for example, the sleep state, image sensing preparation state, or the like) of the radiation imaging apparatus 101 based on the information acquired via the imaging apparatus control unit 1024 of the console 102. The display control unit 1022 controls the changing of a display screen to be displayed on the external display apparatus 40 in accordance with this determination result.

The imaging apparatus control unit 1024 controls the changing of the operating state (state transition) of the radiation imaging apparatus 101 in accordance with an instruction from the state change determination unit 1023. The imaging apparatus control unit 1024 also functions as a communication control unit for transmitting/receiving information to/from the radiation imaging apparatus 101.

Figure 1B:
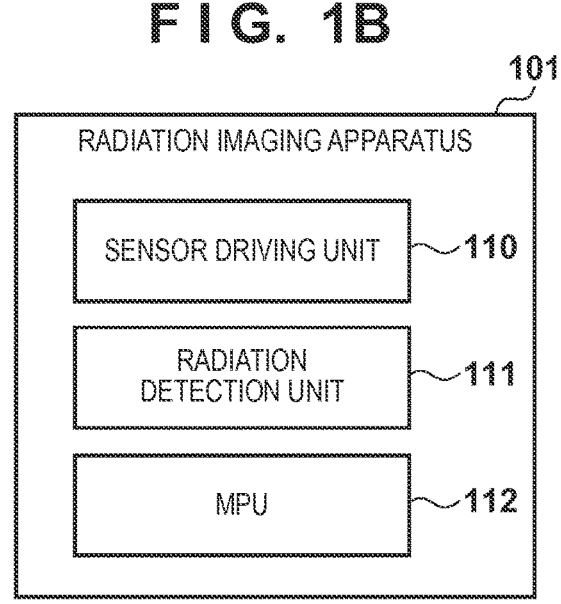

FIG. 1B is a block diagram showing an example of the arrangement of the radiation imaging apparatus 101. The radiation imaging apparatus 101 includes a sensor driving unit 110, a radiation detection unit 111, and an MPU 112. The radiation detection unit 111 includes a sensor array which detects the radiation emitted from the radiation generation apparatus 20. For example, the radiation detection unit 111 includes a sensor array having a two-dimensional array of pixels constituted by a plurality of conversion elements which convert radiation into image signal electric charges (electrical signals) and switching elements such as TFTs which transfer electric signals to the outside. The sensor driving unit 110 drives the radiation detection unit 111. The MPU 112 functions as a control unit which controls the overall operation of the sensor driving unit 110, radiation detection unit 111, and radiation imaging apparatus 101.

FIG. 2A is a block diagram showing an example of the arrangement of the radiation detection unit 111. A drive circuit 1012 simultaneously addresses all the pixels on the rows on a sensor array 1011, which are arranged two-dimensionally. Thereafter, electric charges (pixel outputs) in the respective pixels held by a sample and hold circuit 1013 are sequentially read out via a multiplexer 1014 and amplified by an amplifier 1017. An A/D converter 1016 converts the resultant electric charges into image data of a digital value. Every time scanning on each row is complete, the drive circuit 1012 sequentially drives and scans the next respective rows on the sensor array 1011 to finally convert the electric charges output from all the pixels into digital values. This makes it possible to read out radiation image data. In this case, the apparatus scans the respective pixels on the rows while the voltage applied to each column signal line connected to a corresponding one of the pixels on the rows is fixed to a specific value, and discards the acquired electric charges to discharge dark electric charges, thereby discharging (resetting) the dark electric charges accumulated in the respective pixels. This completes the initialization of the sensor array 1011. The sensor driving unit 110 performs control such as driving control and readout operation control of the radiation detection unit 111.

If the image data converted by the A/D converter 1016 is radiation image data obtained by radiation irradiation, the apparatus performs offset correction by subtracting the offset image data acquired only from dark electric charges in the respective pixels from the radiation image data. Performing offset correction can acquire a captured image from which unnecessary dark electric charge components are removed.

An irradiation detection unit 1015 detects the start of radiation irradiation. A power supply 1020 supplies power for driving the irradiation detection unit 1015 via a wiring 210. In addition, the power supply 1020 supplies power for driving a sensor (the sensor array 1011 and the drive circuit 1012) via a wiring 220. Furthermore, the power supply 1020 supplies power for driving an amplifier (the sample and hold circuit 1013, the multiplexer 1014, the A/D converter 1016, and the amplifier 1017) via a wiring 230.

The imaging apparatus control unit 1024 controls the timings of supplying power from the power supply 1020 to the irradiation detection unit 1015, the sensor, and the amplifier and the timings of stopping the supply of power. The imaging apparatus control unit 1024 can change (ON/OFF) the operating states of the irradiation detection unit 1015, sensor, and amplifier by controlling the timings of supplying power.

The operating states of the radiation imaging apparatus 101 include four states, namely the sleep state, the image sensing preparation state, the image sensing enable state, and the image sensing in-process state (image sensing state). The imaging apparatus control unit 1024 controls the operating state of the radiation imaging apparatus 101 by changing energization (power supply) to the sensor driving unit 110 and the radiation detection unit 111.

In the sleep state, the imaging apparatus control unit 1024 energizes the MPU 112. The imaging apparatus control unit 1024 controls the operating state of the radiation imaging apparatus 101 so as to stop the energization of the sensor driving unit 110 and radiation detection unit 111. In this sleep state, the radiation imaging apparatus 101 cannot perform image sensing (image sensing disable state). In the sleep state, the electric charges accumulated in the sensor array of the radiation detection unit 111 are reset (initialization processing). Resetting the accumulated charges can suppress a deterioration in image quality due to the influence of noise and continuously perform image sensing for a predetermined time (image sensing enable limit time) by maintaining the image sensing ability.

In the image sensing preparation state, the imaging apparatus control unit 1024 controls the operating state of the radiation imaging apparatus 101 so as to energize the MPU 112 and the sensor driving unit 110 and not energize the radiation detection unit 111. In the image sensing preparation state, the radiation detection unit 111 is not energized and hence cannot detect the radiation emitted from the radiation generating apparatus 20. Therefore, the radiation imaging apparatus 101 cannot perform image sensing (image sensing disable state). In the image sensing preparation state, the console 102 allows the operator to perform setting and the like for the radiation imaging system, for example, display setting for displaying the image (past image) transmitted from the radiation imaging apparatus 101 in the past, annotation setting, and connection setting with an external apparatus.

Although the image sensing preparation state can quickly transition to the image sensing enable state, a certain transition time (for example, about 10 sec) needs to elapse (waiting state for image stabilization) between the sleep state and the image sensing preparation state for the stabilization of image quality. As the operator performs preparation work in the image sensing enable state, it consumes the image sensing enable limit time during which image sensing can be continuously performed and shortens the remaining time that enables image sensing. In addition, while the operator performs operation such as referring to past images in the image sensing enable state, the radiation detection unit 111 is energized without any image sensing operation. Such operation is therefore undesirable in terms of power saving. It is possible to perform operation such as referring to past images in the image sensing preparation state. The imaging apparatus control unit 1024 can achieve power saving in the radiation imaging apparatus 101 by controlling the operating state in accordance with operation by the operator.

In the image sensing enable state, the imaging apparatus control unit 1024 performs control to energize the MPU 112, the sensor driving unit 110, and the radiation detection unit 111 to enable the respective units to operate. The sensor driving unit 110 drives the radiation detection unit 111. The radiation detection unit 111 detects the radiation generated from the radiation generating apparatus 20 and enters the image sensing enable state. In the image sensing enable state, since the radiation detection unit 111 is energized, the power consumption is higher than that in the image sensing preparation state.

In the image sensing in-process state (image sensing state), the sensor driving unit 110 drives the radiation detection unit 111 under the overall control of the imaging apparatus control unit 1024 and MPU 112, thereby accumulating electric charges in the respective conversion elements of the sensor array 1011 of the radiation detection unit 111. The sensor driving unit 110 reads out electric charges accumulated in the respective conversion elements of the sensor array 1011 and forms radiation image data.

FIG. 2B is a chart showing the relationship between the operating state of the radiation imaging apparatus 101, the driving state of the sensor array 1011 of the radiation detection unit 111, and the power supply states of the respective units (the sensor, the amplifier, and the irradiation detection unit 1015) of the radiation detection unit 111. Referring to FIG. 2B, "ON" and "OFF" of the sensor power supply respectively indicate the supply of power (ON) and the stop of power supply (OFF) with respect to the sensor (the sensor array 1011 and the drive circuit 1012). "ON", "low power state", and "OFF" of the amplifier power supply respectively indicate the supply of power (ON), partial supply of power (low power state), and the stop of power supply (OFF) with respect to the amplifier (the sample and hold circuit 1013, the multiplexer 1014, the A/D converter 1016, and the amplifier 1017). In addition, "ON" and "OFF" of the irradiation detection unit power supply respectively indicate the supply of power (ON) and the stop of power supply (OFF) with respect to the irradiation detection unit 1015.

While the radiation imaging apparatus 101 is in the sleep state (S10), the sensor power supply, the amplifier power supply, and the irradiation detection unit power supply are OFF. In the image stabilization waiting state (S20) in the period of transitioning the state of radiation imaging apparatus 101 from the sleep state (S10) to the image sensing preparation state (S30), the sensor power supply is ON, the amplifier power supply is in the low power state in which it supplies power to some constituent elements of the amplifier, and the irradiation detection unit power supply is OFF. In the image stabilization waiting state (S20), upon turning on the sensor power supply, the sensor driving unit 110 performs driving to discard charges for the initialization of the sensor array 1011.

In the image sensing preparation state (S30), the sensor power supply is ON, the amplifier power supply is in the low power state in which it supplies power to some constituent elements of the amplifier, and the irradiation detection unit power supply is OFF. In the image sensing preparation state (S30), the sensor driving unit 110 also performs driving to discard charges for the initialization of the sensor array 1011.

In the image sensing enable state (S40), the sensor power supply is ON, the amplifier power supply is in the low power state in which it supplies power to some constituent elements of the amplifier, and the irradiation detection unit power is ON. Turning on the irradiation detection unit power supply enables the irradiation detection unit 1015 to detect the start of radiation irradiation. In the image sensing enable state (S40), the sensor driving unit 110 performs driving to discard charges.

In the image sensing in-process state (S50), the sensor power supply is ON, and the sensor driving unit 110 controls the driving of the sensor array 1011 to accumulate electric charges originating from radiation irradiation. In the charge accumulating state, the amplifier power supply is in the low power state. When the sensor driving unit 110 performs driving to read out electric charges, the amplifier power supply is turned on to enter the high power supply state from the low power state.

In the image sensing in-process state (S50), the irradiation detection unit power supply shifts to the OFF state from the ON state. The imaging apparatus control unit 1024 can achieve power saving in the radiation imaging apparatus 101 by controlling the supply of power to the respective units in accordance with the operating state of the radiation imaging apparatus 101 in this manner.

Figure 3A:
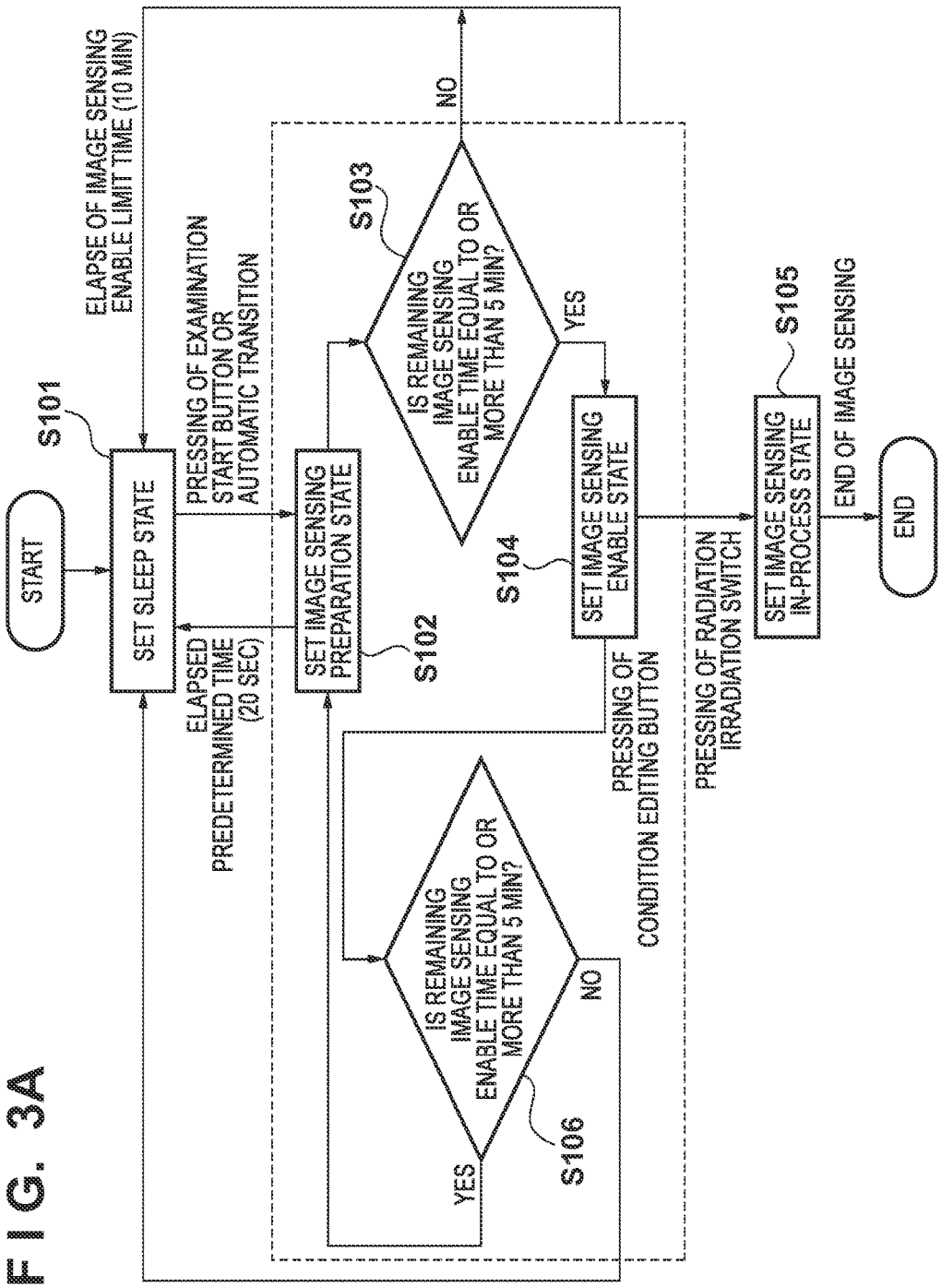
FIG. 3A is a flowchart for explaining a procedure for the operation of the radiation imaging system according to the embodiment.

FIG. 3A is a flowchart for explaining a procedure for the operation of the radiation imaging apparatus 101 and console 102 according to this embodiment. FIG. 3B is a view exemplarily showing the changing of screens (screen transition) to be displayed on the external display apparatus 40 by the display control unit 1022 of the console 102.

The screens in FIG. 3B include a working screen 400 for, for example, inputting information for image sensing operation and a screen saver screen 410 which is changed from the working screen when no operation is performed on the radiation imaging apparatus 101 for a predetermined time. When the operation detection unit 1021 detects an operation input while the screen saver screen 410 is displayed, the display control unit 1022 changes the display screen to the working screen 400.

The working screen 400 includes a system setting screen 408, an examination screen 415, and a past image screen 448. The display control unit 1022 changes screen display in accordance with an operation input from each screen. In addition, the examination screen 415 includes an information input screen 418, an imaging screen 428, and a suspension screen 438. The display control unit 1022 performs screen display changing in accordance with an operation input from each screen.

FIG. 4A is a view showing an example of the system setting screen 408. The operator can make settings for the radiation imaging system, for example, display settings for displaying the image transmitted from the radiation imaging apparatus 101 and connection settings with external apparatuses, via the system setting screen 408. When the operator presses the system button of each of the examination screens 415 and the past image screens 448, the display control unit 1022 changes the display screen to the system setting screen 408. When the operator presses the application button on the system setting screen 408, the contents of system settings are reflected. When the operator presses the OK button, the display control unit 1022 restores the screen before changing. When the operator presses the cancel button, the display control unit 1022 restores the screen before changing without changing the contents of the system settings.

FIG. 4B is a view exemplifying a warning screen 4014. If an error occurs in internal processing in the radiation imaging system 10 and the operation detection unit 1021 detects the error, the operation detection unit 1021 notifies the display control unit 1022 and the state change determination unit 1023 of the detection of the error. Upon reception of this notification, the display control unit 1022 displays the warning screen 4014 on the external display apparatus 40. The state change determination unit 1023 notifies the imaging apparatus control unit 1024 of the detection of the error. Upon reception of the notification, the imaging apparatus control unit 1024 stops the overall operation of the radiation imaging system.

The operation of the radiation imaging apparatus 101 and console 102 will be described below with reference to FIGS. 3A and 3B.

(Sleep State/Information Input Screen Display)

In step S101, the radiation imaging apparatus 101 is in the sleep state. At this time, the display control unit 1022 displays a patient information input screen 403 as the information input screen 418 on the external display apparatus 40 (FIGS. 3B and 5A) to set an information input waiting state for the operator.

FIG. 5A is a view showing an example of the patient information input screen 403. The operator inputs information about a patient to be imaged as an object on this screen. When the operator presses a condition editing button 510 on the patient information input screen 403, the display control unit 1022 changes the display screen to a condition editing screen 404 (FIG. 5B).

Figure 6A:
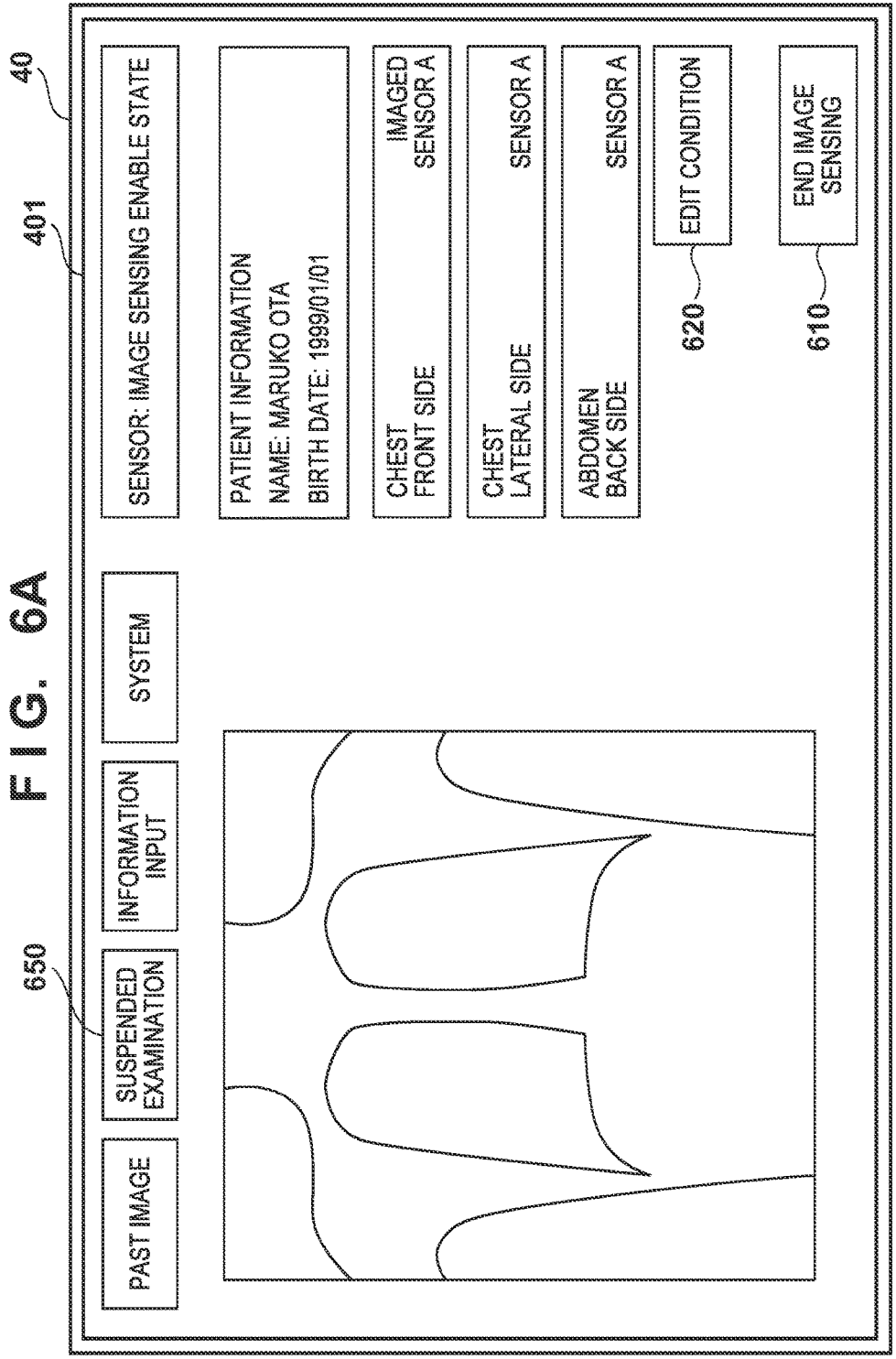
FIG. 6A is a view showing an example of a radiation imaging screen.

FIG. 5B is a view showing an example of the condition editing screen 404. The operator can select a sensor to be used, a region of an object to be imaged, and the like via the condition editing screen 404. When the operator presses a cancel button 530, the display control unit 1022 changes the display screen to the patient information input screen 403 (FIG. 5A). When the operator presses an examination start button 520 after inputting information via the patient information input screen 403 and the condition editing screen 404, the display control unit 1022 changes the display screen to a radiation imaging screen 401 (FIG. 6A).

The operating state of the radiation imaging apparatus 101 transitions from the sleep state to the image sensing preparation state (step S102) under the control of the imaging apparatus control unit 1024. The imaging apparatus control unit 1024 can also control the operating state so as to make a transition (automatic transition) from the sleep state to the image sensing preparation state upon completion of information input via the patient information input screen 403 and the condition editing screen 404 regardless of whether the operator presses the examination start button.

(Image Sensing Preparation State/Imaging Screen Display)

In step S102, the radiation imaging apparatus 101 is set in the image sensing preparation state.

FIG. 6A is a view showing an example of the radiation imaging screen 401, which is a screen to be displayed when the radiation generating apparatus 20 actually emits radiation and the radiation imaging apparatus performs radiation imaging. When the operator presses an imaging end button 610, the display control unit 1022 changes the display screen to the patient information input screen 403 (FIG. 5A) for information input for image sensing of the next object. When changing image sensing conditions, the operator presses a condition editing button 620, the display control unit 1022 changes the display screen to a condition editing screen 405 (FIG. 6B).

FIG. 6B shows an example of the condition editing screen 405 for radiation imaging. The operator can select a sensor to be used, a region of an object to be imaged, and the like via the condition editing screen 405. When the operator presses a cancel button 630, the display control unit 1022 changes the display screen to the radiation imaging screen 401 in FIG. 6A without reflecting any image sensing condition editing result. When the operator presses an examination start button 640, the radiation imaging screen 401 (FIG. 6A) reflecting the image sensing condition editing result is displayed.

Referring to FIGS. 6A and 6B, when the operator presses suspended examination buttons 650 and 660, the display control unit 1022 changes the display screen to a suspended examination screen 406 in FIG. 7A.

FIG. 7A is a view showing an example of the suspended examination screen 406 displaying a list of suspended examinations. When the operator selects a suspended examination of an object (suspended examination) via the suspended examination screen 406 and presses an examination start button 730, the radiation imaging screen 401 (FIG. 6A) corresponding to the selected suspended examination is displayed.

When the operator presses a condition editing button 740, the display control unit 1022 changes the display screen to a condition editing screen 407 (FIG. 7B). FIG. 7B shows an example of the condition editing screen 407 for a suspended examination. The operator can select a sensor to be used for a suspended examination, a region of an object to be imaged, and the like via the condition editing screen 407. When the operator presses a cancel button 750, the display control unit 1022 changes the display screen to the suspended examination screen 406 in FIG. 7A without reflecting any suspended examination condition editing result. When the operator presses an examination start button 760, the radiation imaging screen 401 (FIG. 6A) reflecting the suspended examination condition editing result is displayed.

When the operator presses past image buttons 770 and 780 on the suspended examination screen 406 and the condition editing screen 407 for a suspended examination, the display control unit 1022 changes the display screen to a past image selection screen 409 for the selection of a patient as a target from a list of patients imaged in the past. FIG. 8A is a view showing an example of the past image selection screen 409 for selecting a target patient from a list of patients imaged in the past. When the operator selects a target patient via the past image selection screen 409 and presses a reference start button 810, the past image reference screen 402 displays an image of the selected patient which was captured in the past.

FIG. 8B is a view showing an example of the past image reference screen 402. When the operator presses a reference end button 820, the display control unit 1022 changes the display screen to the past image selection screen 409 (FIG. 8A).

Note that the way of displaying the past image selection screen 409 is not limited to the pressing of the past image buttons on the suspension screen 438 (the suspended examination screen 406 and the condition editing screen 407). For example, it is also possible to display the above screen by pressing past image buttons on the information input screen 418 (the patient information input screen 403 and the condition editing screen 404) and the imaging screen 428 (the radiation imaging screen 401 and the condition editing screen 405).

When stopping image sensing in the image sensing preparation state (step S102), the imaging apparatus control unit 1024 returns to the processing in step S101. Assume that a predetermined time (for example, 20 sec) has elapsed since a transition from the sleep state to the image sensing preparation state without any operation input such as pressing operation for an operation instruction (examination start button) for the start of image sensing within a predetermined time. In this case, the state change determination unit 1023 determines to temporarily stop image sensing. In accordance with this determination result, the imaging apparatus control unit 1024 returns from the image sensing preparation state (step S102) to the sleep state (step S101). Note that 20 sec as the time from transition to the image sensing preparation state is an exemplary time and can be arbitrarily set.

(First Determination on Remaining Image Sensing Enable Time)

When the operating state transitions from the image sensing preparation state (step S102) to the image sensing enable state (step S104), the imaging apparatus control unit 1024 determines in step S103 whether the remaining image sensing enable time is equal to or more than a predetermined threshold time (X).

In this case, the time during which a radiation image can be captured by using the radiation detection unit 111, starting from the initialization of the sensor array 1011 is defined as "image sensing enable limit time". In an image sensing enable limit time, the radiation detection unit 111 can continuously perform image sensing while maintaining the image sensing ability without being influenced by noise. In addition, the elapsed time from the initialization of the radiation detection unit 111 is defined as "image sensing elapsed time". The time acquired by subtracting an image sensing elapsed time from an image sensing enable limit time (subtraction processing) is defined as "remaining image sensing enable time". Assume that the threshold time (X) is 5 min. In this case, if the remaining image sensing enable time is less than the threshold time (NO in step S103), the imaging apparatus control unit 1024 controls the energization of the respective units constituting the radiation imaging apparatus 101 so as to make the process shift to the sleep state (step S101).

Upon determining in step S103 that the remaining image sensing enable time is equal to or more than the threshold time (YES in step S103), the imaging apparatus control unit 1024 makes the process advance to step S104. Note that although the threshold time (X) indicating that image sensing can be performed is set to 5 min or more, this time is exemplary. The scope of the present invention is not limited to this.

(Image Sensing Enable State)

In step S104, the imaging apparatus control unit 1024 controls the energization of the respective units constituting the radiation imaging apparatus 101 so as to make a transition to the image sensing enable state. That is, the imaging apparatus control unit 1024 performs control to energize the sensor driving unit 110 and the radiation detection unit 111 so as to enable the respective units to operate. In this case, if the process advances to step S104 based on the determination made in step S103, it is guaranteed that the remaining image sensing enable time indicating that it is possible to perform image sensing while maintaining the image sensing ability is equal to or more than the threshold time (X). This makes it possible to perform image sensing upon preparing conditions necessary for image sensing, for example, preparing conditions for an object. When the operator presses the radiation irradiation switch in the image sensing enable state in step S104, the process advances to step S105.

(Image Sensing In-process State)

In step S105, the sensor driving unit 110 drives the radiation detection unit 111 under the overall control of the imaging apparatus control unit 1024 and MPU 112, thereby accumulating electric charges in the respective conversion elements of the sensor array of the radiation detection unit 111. The apparatus reads out electric charges accumulated in the respective conversion elements of the sensor array of the radiation detection unit 111 and forms radiation image data. The radiation imaging of the object is then complete.

(Condition Editing in Image Sensing Enable State)

When the operator presses the condition editing button 620 on the currently displayed radiation imaging screen 401 to change image sensing conditions in the image sensing enable state in step S104, the display control unit 1022 changes the display screen to the condition editing screen (imaging screen) 405 (FIG. 6B). The state change determination unit 1023 notifies the imaging apparatus control unit 1024 of the state change. Upon receiving the notification, the imaging apparatus control unit 1024 makes the process advance to step S106 to temporarily stop image sensing.

(Second Determination on Remaining Image Sensing Enable Time)

In step S106, the imaging apparatus control unit 1024 determines whether the remaining image sensing enable time is equal to or more than a predetermined threshold time (Y) (second determination). Assume that the threshold time (Y) is 5 min . In this case, if the remaining image sensing enable time is less than 5 min (NO in step S106), the imaging apparatus control unit 1024 controls the energization of the respective units constituting the radiation imaging apparatus 101 so as to make the process transition to the sleep state (step S101). That is, the imaging apparatus control unit 1024 controls the operating state of the radiation imaging apparatus 101 so as to stop energizing the sensor driving unit 110 and the radiation detection unit 111. In this sleep state, the apparatus resets the electric charges (dark electric charges) accumulated in the sensor array of the radiation detection unit 111 (initialization processing).

Upon determining in step S106 (second determination) that the remaining image sensing enable time is equal to or more than the threshold time (YES in step S106), the imaging apparatus control unit 1024 makes the process advance to step S102. The imaging apparatus control unit 1024 controls the operating state of the radiation imaging apparatus 101 so as to energize the sensor driving unit 110 and not to energize the radiation detection unit 111. Making the process return to the image sensing preparation state enables the imaging apparatus control unit 1024 to make the operating state transition to the image sensing enable state (step S103) without waiting for the elapse of the transition time from the initialization processing in the sleep state (step S101) and the sleep state to the image sensing preparation state (step S102).

When the operating state returns from step S106 to the sleep state (step S101) and the image sensing preparation state (step S102), the apparatus repeats the same processing as that described above in steps S101 and S102 and the subsequent steps. If the image sensing enable limit time is limited to, for example, 10 min, the processing time in the image sensing preparation state (step S102), the image sensing enable state (step S104), and the determination processing in steps S103 and S106 is restricted by 10 min. For example, the imaging apparatus control unit 1024 measures the elapse of time by using a timer. If each of the processing times in the image sensing preparation state (step S102), image sensing enable state (step S104), and steps S103 and S106 has elapsed over the image sensing enable limit time, the imaging apparatus control unit 1024 controls the energization of the respective units constituting the radiation imaging apparatus 101 so as to make a transition to the sleep state (step S101). The imaging apparatus control unit 1024 makes the operating state of the radiation imaging apparatus 101 return to the sleep state to reset the electric charges (dark electric charges) accumulated in the sensor array 1011 of the radiation detection unit 111 by initialization processing. Subsequently, the operating state transitions to the image sensing preparation state (step S102) upon pressing of the examination button or by automatic transition processing. The apparatus repeats the same processing as that described in step S102 and the subsequent steps.

According to this embodiment, it is possible to perform radiation imaging while ensuring a sufficient image sensing time for actual image sensing and reduce the possibility of misshooting, that is, failing to perform radiation imaging.

In the scheme in which a radiation generation apparatus and a radiation imaging apparatus do not communicate with each other, it is possible to ensure a sufficient image sensing time for actual image sensing operation and reduce the possibility of misshooting while saving power by shortening the time taken to enable the radiation imaging apparatus to enter the image sensing enable state.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-044723, filed Mar. 6, 2013, which is hereby incorporated by reference herein in its entirety.

What is claimed is:

1. A radiation imaging system comprising:
a radiation imaging apparatus including a radiation detection unit in which a plurality of conversion elements configured to convert radiation into electric charges are arranged and a driving unit configured to drive the radiation detection unit; and
a control apparatus configured to control the radiation imaging apparatus,
wherein the control apparatus comprises:
an operation detection unit configured to detect an operation instruction for the control apparatus;
a determination unit configured to determine, in accordance with the operation instruction detected by the operation detection unit, whether a difference time acquired by subtracting an elapsed time from initialization of the radiation detection unit from an image sensing enable time indicating a time capable of image sensing a radiation image in use of the radiation detection unit is not less than a threshold time; and
a control unit configured to change operating states of the radiation detection unit and the driving unit in accordance with a determination result of the determination unit, wherein if it is determined that the difference time is not less than the threshold time, the control unit energizes the radiation detection unit and the driving unit to set the operating state to an image sensing enable state, and wherein if it is determined that the difference time is less than the threshold time, the control unit stops energizing the radiation detection unit and the driving unit to shift the operating state to a sleep state.

2. The system according to claim 1, wherein if the operation instruction for an examination start is detected by the operation detection unit in the sleep state, the control unit sets an image sensing preparation state in which energization of the radiation detection unit is stopped and the driving unit is energized.

3. The system according to claim 1, wherein the control unit stops energizing the radiation detection unit after setting the sleep state, and sets an image sensing preparation state in which the driving unit is energized.

4. The system according to claim 3, wherein if the operation detection unit detects an operation instruction for starting image sensing, in the image sensing preparation state, the control unit shifts the operating state from the image sensing preparation state to an image sensing enable state in which the control unit energizes the radiation detection unit and the driving unit.

5. The system according to claim 4, wherein if the operation detection unit detects an operation instruction for performing radiation irradiation in the image sensing enable state, the control unit changes the operating state from the image sensing enable state to an image sensing state in which the driving unit drives the radiation detection unit to capture a radiation image.

6. The system according to claim 1, wherein the control unit performs initialization processing for resetting electric charges accumulated in the conversion elements of the radiation detection unit in the sleep state.

7. The apparatus according to claim 1, wherein if it is determined that the difference time is not less than the threshold time, the control unit sets an operating state in which the control unit energizes the radiation detection unit and the driving unit, and if the operation detection unit detects an operation instruction for editing a condition in the operating state, the determination unit determines whether the difference time is not less than the threshold time.

8. A control apparatus which controls a radiation imaging apparatus including a radiation detection unit configured to detect radiation and a driving unit configured to drive the radiation detection unit, the apparatus comprising:
an operation detection unit configured to detect an operation instruction for the control apparatus;
a determination unit configured to determine, in accordance with the operation instruction detected by the operation detection unit, whether a difference time acquired by subtracting an elapsed time from initialization of the radiation detection unit from an image sensing enable time indicating a time capable of image sensing a radiation image in use of the radiation detection unit is not less than a threshold time; and
a control unit configured to change operating states of the radiation detection unit and the driving unit in accordance with a determination result of the determination unit, wherein if it is determined that the difference time is not less than the threshold time, the control unit energizes the radiation detection unit and the driving unit to set the operating state to an image sensing enable state, and wherein if it is determined that the difference time is less than the threshold time, the control unit stops energizing the radiation detection unit and the driving unit to shift the operating state to a sleep state.

9. A method of controlling a control apparatus which controls a radiation imaging apparatus including a radiation detection unit configured to detect radiation and a driving unit configured to drive the radiation detection unit, the method comprising:
an operation detection step of detecting an operation instruction for the control apparatus;
a determination step of determining, in accordance with the operation instruction detected in the operation detection step, whether a difference time acquired by subtracting an elapsed time from initialization of the radiation detection unit from an image sensing enable time indicating a time capable of image sensing radiation image in use of the radiation detection unit is not less than a threshold time; and
a control step of changing operating states of the radiation detection unit and the driving unit in accordance with a determination result in the determination step, wherein if it is determined that the difference time is not less than the threshold time, the control step includes energizing the radiation detection unit and the driving unit to set the operating state to an image sensing enable state, and wherein if it is determined that the difference time is less than the threshold time, the control unit stops energizing the radiation detection unit and the driving unit to shift the operating state to a sleep state.

10. A non-transitory computer-readable storage medium storing a program for causing a computer to execute each step in a method of controlling a control apparatus which controls a radiation imaging apparatus including a radiation detection unit configured to detect radiation and a driving unit configured to drive the radiation detection unit, the method comprising:
an operation detection step of detecting an operation instruction for the control apparatus;

a determination step of determining, in accordance with the operation instruction detected in the operation detection step, whether a difference time acquired by subtracting an elapsed time from initialization of the radiation detection unit from an image sensing enable time indicating a time capable of image sensing a radiation image in use of the radiation detection unit is not less than a threshold time; and a control step of changing operating states of the radiation detection unit and the driving unit in accordance with a determination result in the determination step, wherein if it is determined that the difference time is not less than the threshold time, the control step includes energizing the radiation detection unit and the driving unit to set the operating state to an image sensing enable state, and wherein if it is determined that the difference time is less than the threshold time, the control unit stops energizing the radiation detection unit and the driving unit to shift the operating state to a sleep state.

* * * * *